United States Patent
Itonori et al.

(10) Patent No.: US 7,738,737 B2
(45) Date of Patent: Jun. 15, 2010

(54) IMAGE PROCESSING APPARATUS AND IMAGE PROCESSING METHOD

(75) Inventors: Katsuhiko Itonori, Ashigarakami-gun (JP); Hiroaki Ikegami, Ashigarakami-gun (JP); Hideaki Ashikaga, Ashigarakami-gun (JP); Shunichi Kimura, Ashigarakami-gun (JP); Hiroki Yoshimura, Ashigarakami-gun (JP); Masanori Onda, Ashigarakami-gun (JP); Masahiro Kato, Ashigarakami-gun (JP); Masanori Satake, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1122 days.

(21) Appl. No.: 11/378,643

(22) Filed: Mar. 20, 2006

(65) Prior Publication Data
US 2006/0215187 A1      Sep. 28, 2006

(30) Foreign Application Priority Data
Mar. 25, 2005    (JP) .............................. 2005-090231

(51) Int. Cl.
*G06K 9/32* (2006.01)
(52) U.S. Cl. .................... 382/298; 382/299; 382/301; 382/177; 382/181
(58) Field of Classification Search ......... 358/1.1–1.16; 382/298, 299, 301, 177, 181
See application file for complete search history.

(56) References Cited

U.S. PATENT DOCUMENTS 5,566,252 A * 10/1996 Miyaza ....................... 382/298
6,381,368 B1     4/2002 Kanatsu

FOREIGN PATENT DOCUMENTS

| JP | A 7-115493 | 5/1995 |
| JP | A-11-167623 | 6/1999 |
| JP | A-2003-281470 | 10/2003 |

OTHER PUBLICATIONS

Aug. 18, 2009 Office Action issued in Japanese Application No. 2005-090231.

\* cited by examiner

*Primary Examiner*—Benny Q Tieu
*Assistant Examiner*—Michael Tzeng
(74) *Attorney, Agent, or Firm*—Oliff & Berridge, PLC

(57) ABSTRACT

An image processing apparatus sequentially reduces a document, while changing the reduction factor step-by-step. Next, the image processing apparatus refers to the characters that constitute the document that has been reduced with the respective reduction factors, and specifies a reduction factor at which blank regions surrounded by line portions that express each character do not disappear. When an appropriate reduction factor is specified, the image processing apparatus specifies a resolution of the characters for that reduction factor, and converts the resolution of the document data to that specified resolution. Then, the image processing apparatus performs various processing for the document data whose resolution has been converted. Thus the resolution of document data is converted such that the document is reduced with a reduction factor suitable for computer processing.

5 Claims, 3 Drawing Sheets

← REDUCTION FACTOR a

← REDUCTION FACTOR b

← REDUCTION FACTOR c

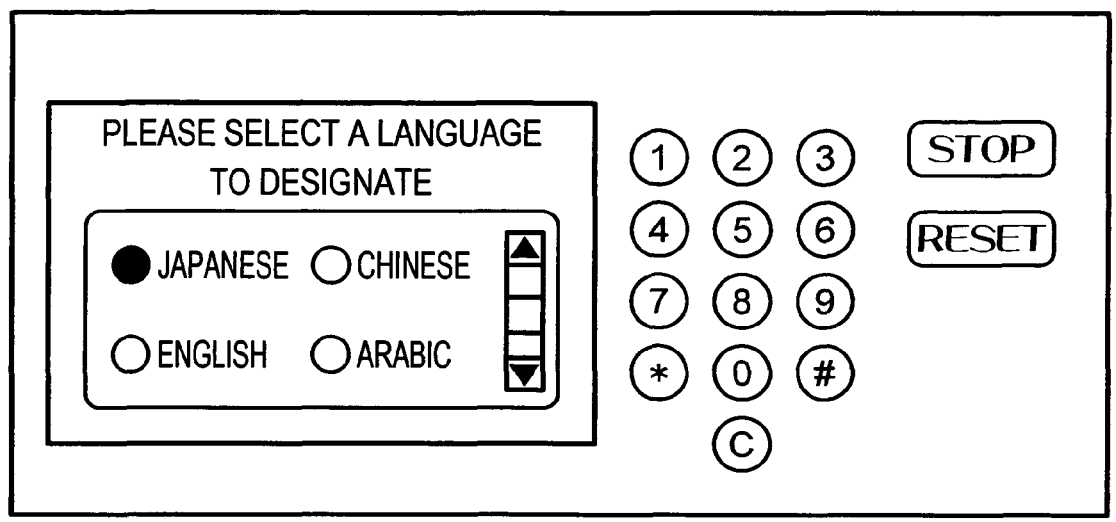

IMAGE PROCESSING APPARATUS AND IMAGE PROCESSING METHOD

BACKGROUND

1. Technical Field

The present invention relates to, for example, technology that converts the resolution of document data.

2. Related Art

Image processing apparatuses such as copy machines are often provided with a function that copies by reducing or enlarging a document manuscript. In this case, the image processing apparatus reads the document manuscript with an imaging element, stores the obtained image data in an image memory, then performs reduction processing or enlargement processing for that image data and outputs to recording paper. The reduction and enlargement factors are specified to a desired value by the operator, but, for example, when a reduction factor that is too high has been specified, the characters written in that document become too small and the outline of characters and the like is lost, and it may become impossible for the characters to be read by human eyes.

Incidentally, the processing performed for the document manuscript, other than copy processing, may for example be character recognition processing. When this sort of character recognition processing is performed, performing processing with the resolution of the document data dropped (i.e. with the document reduced) is advantageous, because this results in a smaller amount of that document data and also a decrease in the occupied storage area of the image memory. Accordingly, technology is necessary for reducing a document with a range in which computer processing is possible.

The ability of a person to recognize characters may be greater than the character recognition ability with computer processing. With human eyes, even in a case in which part of a character is lost due to quite small font size, that character can be recognized with the operation of experienced speculation. For example, in the character "中", even if the blank portion surrounded by the line portion collapses, when viewed with human eyes, that can often be recognized as the character "中". On the other hand, when computer processing with the goal of character recognition is performed, if the above sort of blank portion collapses, the probability of this causing erroneous recognition is high.

SUMMARY

One aspect of the present invention provides an image processing apparatus that includes an input unit that inputs document data; an image reduction unit that sequentially reduces a document expressed by document data that has been input step-by-step, while changing a reduction factor; a reduction factor specification unit that refers to the characters that constitute the document that has been reduced with the respective reduction factors, and specifies a reduction factor at which blank regions surrounded by line portions that express each character do not disappear; a resolution specification unit that specifies a resolution of the characters for the reduction factor that has been specified; a resolution conversion unit that converts the resolution of the document data that has been input by the input unit to the resolution that has been specified by the resolution specification unit; and a processing unit that performs predetermined processing for the document data whose resolution has been converted.

BRIEF DESCRIPTION OF THE DRAWINGS

Embodiments of the present invention will be described in detail based on the following figures, wherein:

FIG. 6 shows an example of an operating screen displayed on a user interface apparatus; and FIG. 7 shows an example of information stored in a resolution condition storage portion.

DETAILED DESCRIPTION

Following is a description of embodiments of the present invention.

(1) First Embodiment

First, an overview of a first embodiment will be given.

Figure 1:
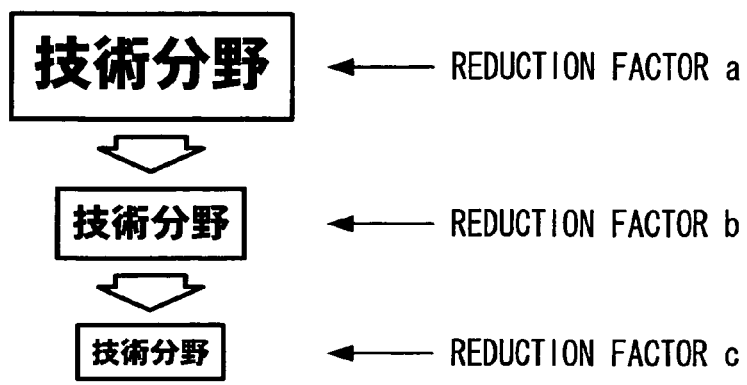
FIG. 1 shows the way in which a particular character string is reduced in stages from a reduction factor a to a reduction factor b to a reduction factor c.

FIG. 1 shows the way in which a character string "技術分野" is reduced in stages from a reduction factor a to a reduction factor b to a reduction factor c (a<b<c). In FIG. 1, the character string "技術分野" can be read with human eyes even when it has been reduced with the highest reduction factor. However, when the image processing apparatus attempts to execute character recognition for these character strings by computer processing, in the character string that has been reduced with the highest reduction factor c, the character "野" of "技術分野" collapses, and can not be correctly recognized. Accordingly, if a reduction factor is specified that is only slightly less than the reduction factor at which characters collapse and the document is reduced with that reduction factor, the image processing apparatus can perform various computer processing on this document, and that processing can be performed by handling only a small amount of data.

Figure 2:
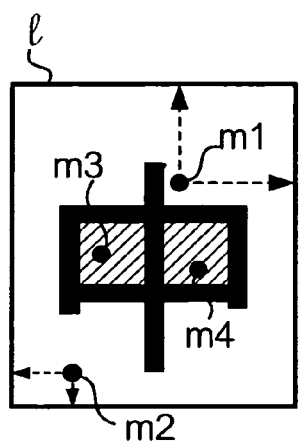
FIG. 2 illustrates blank regions surrounded by line portions that express each character.

Therefore, the image processing apparatus first sequentially reduces the document, while changing the reduction factor step-by-step. Next, the image processing apparatus refers to the characters that constitute the document that has been reduced with the respective reduction factors, and specifies a reduction factor at which the blank regions surrounded by the line portions that express each character do not disappear. The "blank regions surrounded by line portions that express each character" referred to here are, for example, in the case of the character "中" in FIG. 2, the regions in which diagonal lines are applied. Reference letter 1 in FIG. 2 is a border line of a character region that includes each character one at a time. As shown by the dotted line arrows in FIG. 2, the set of points m1 and m2 that can reach the border line 1 without being blocked by the line portions of the character are the "blank regions not surrounded by line portions that express each character", and conversely, the set of points m3 and m4 that can not reach the border line 1 due to being blocked by the line portions of the character correspond to the "blank regions surrounded by line portions that express each character".

When an appropriate reduction factor is specified in this manner, the image processing apparatus specifies the resolution of the characters for that reduction factor, and converts the resolution of the document data to that specified resolution. Also, the image processing apparatus may perform various processing for that document data whose resolution has been converted.

Following is a detailed description of the first embodiment.

Figure 3:
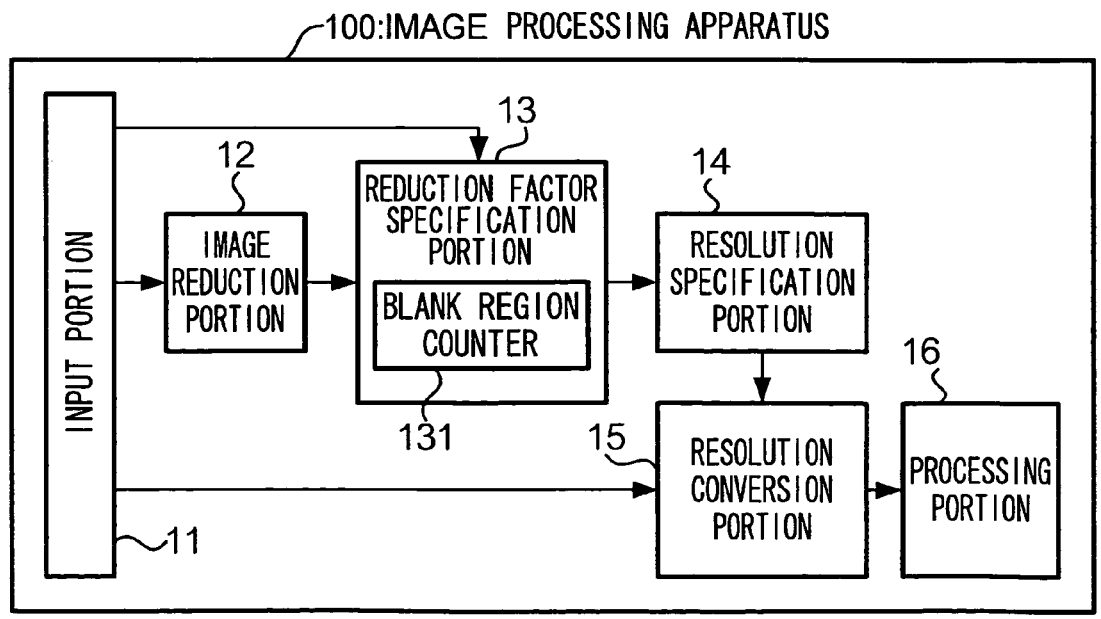
FIG. 3 is a block diagram that shows the configuration of an image processing apparatus according to a first embodiment.

An image processing apparatus 100 according to the first embodiment may be, for example, realized by a computer built into a color printer or color copier, or a compound machine provided with both of these multiple functions, or it may be realized by a computer as a host apparatus connected to a scanner apparatus or a compound machine (same also for a second embodiment described below). FIG. 3 shows an apparatus configuration in the case in which the image processing apparatus 100 is realized by the former sort of computer. As shown in FIG. 3, the image processing apparatus 100 is provided with an input portion 11, an image reduction portion 12, a reduction factor specification portion 13, a resolution specification portion 14, a resolution conversion portion 15, and a processing portion 16. The input portion 11 is an input device such as a scanner apparatus, for example. The image reduction portion 12, the reduction factor specification portion 13, the resolution specification portion 14, the resolution conversion portion 15, and the processing portion 16 have a configuration that is realized by a computing apparatus such as a CPU executing a computer program.

The function of each portion is as follows.

The input portion 11 inputs document data obtained by reading a document manuscript with an imaging element such as a CCD into the image processing apparatus 100. In this case, it is desirable that the input portion 11 obtains document data with as high a resolution as possible. Here, it is supposed for example that document data at a resolution of 400 dpi has been obtained. The image reduction portion 12 reduces the document expressed by the input document data step-by-step, changing the reduction factor in stages. Then, referring to the characters that constitute the document that has been reduced with the respective reduction factors, the reduction factor specification portion 13 specifies a reduction factor at which the blank regions surrounded by the line portions that express each character do not disappear. In this case, it is desirable that the reduction factor specification portion 13 specifies, from among the reduction factors at which the blank regions surrounded the line portions do not disappear, the largest reduction factor (i.e., the reduction factor at which the characters are reduced to the smallest size).

Following is a more specific description of the function of this reduction factor specification portion 13.

Figure 4:
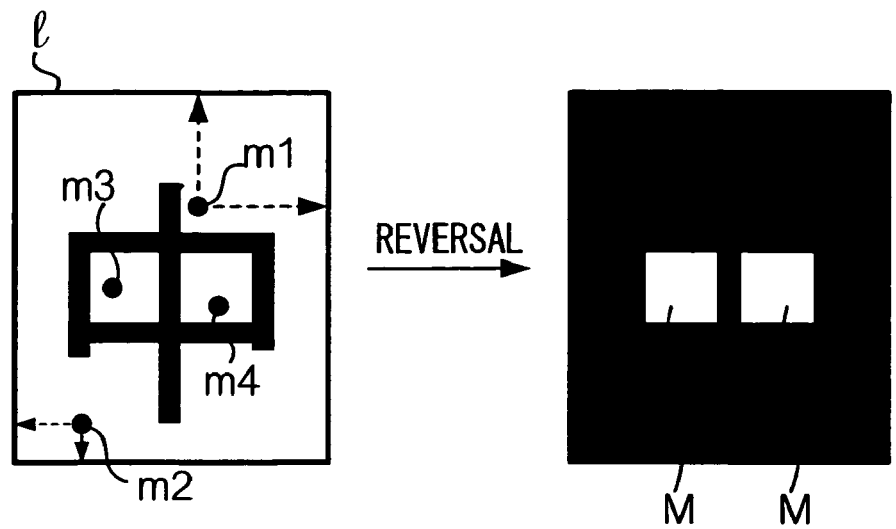
FIG. 4 shows the way in which a reduction factor specification portion of the same image processing apparatus specifies the blank regions surrounded by the line portions that express each character.

First, the reduction factor specification portion 13 analyzes the document data prior to reduction that has been input by the input portion 11, and captures character regions from that document. Here it is supposed that, for example, a character region that includes the character "中" as shown on the left side of FIG. 4 has been captured. Next, the reduction factor specification portion 13 reverses the set of points for the captured character region that can reach the boundary line 1 of that character region from the background color to the color of the line portions (usually black) of the character. Thus, the character region that includes the character "中" is converted to an image as shown on the right side of FIG. 4. As can be understood when viewing FIG. 4, with this sort of reversal processing it is possible to extract only the necessary blank regions M, in a form that is clearly distinguished from other regions.

Next, from among the blank regions that have been extracted by the reversal processing, the reduction factor specification portion 13 specifies a blank region larger than a predetermined size as the blank region to be the target of processing. That is because when a blank region that is too small is chosen as the processing target, the reduction factor at which that blank region disappears also becomes very low (i.e., the character is not reduced very much). Next, across all of the character regions, the reduction factor specification portion 13 counts the number of specified blank regions, and stores that number in a blank region counter 131. Then, referring to the character regions that have been reduced with each reduction factor by the resolution reduction portion 12, the reduction factor specification portion 13 obtains the reduction factor when the number of blank regions in each character region has become less than the number that has been stored by the blank region counter 131. Then, the reduction factor specification portion 13 specifies the reduction factor that is one step less than the obtained reduction factor as the optimal reduction factor for that document.

When the reduction factor is specified in this manner, the resolution specification portion 14 specifies the resolution of the characters at that reduction factor. Here it is supposed that, for example, a resolution of 200 dpi has been specified. The resolution conversion portion 15 converts the resolution of the document data that has been input by the input portion 11 (here, 400 dpi) to the resolution that has been specified by the resolution specification portion 14 (200 dpi). The processing portion 16 performs predetermined processing for the document data whose resolution has been converted. For example, the processing portion 16 may perform character recognition processing for the document data whose resolution has been converted, or it may further perform translation after performing character recognition processing for the document data whose resolution has been converted, or it may store the document data whose resolution has been converted in an internal storage apparatus or an external storage medium, or it may output the document data whose resolution has been converted to an external apparatus.

With this first embodiment, because a reduction factor is specified that is only slightly lower than the reduction factor at which characters collapse and computer processing cannot be performed, and the document is reduced with that reduction factor, the image processing apparatus can perform various computer processing on this document, and that processing can be performed by handling only a small amount of data. For example, because roman characters and the like are constituted by few line portions and the blank regions of the character regions are relatively large, it is possible to perform resolution conversion at a low resolution. On the other hand, Chinese characters and the like are constituted by many line portions and the blank regions of the character regions are relatively small, so as a result, resolution conversion of Chinese characters is performed at a high resolution. Also, when the font size of the characters of the document manuscript is small, the blank regions of those characters naturally become small as well, and so it is possible to perform resolution conversion at a larger resolution. On the other hand, when the font size of the characters is large, the blank regions of those characters also become large, and so resolution conversion is performed at a smaller resolution. In this manner it is possible to perform resolution conversion at a suitable resolution according to the type of characters that constitute the document.

(2) Second Embodiment

In the above first embodiment, a configuration was described in which an optimal reduction factor was specified for each document input into the input portion 11, and resolution conversion was performed according to that reduction factor. However, in the second embodiment, a configuration is described in which an optimal reduction factor is specified in advance for each language type that has been depicted in the document, and when the language types of the document that will be entered are specified, resolution conversion is performed with a suitable resolution according to those language types.

Figure 5:
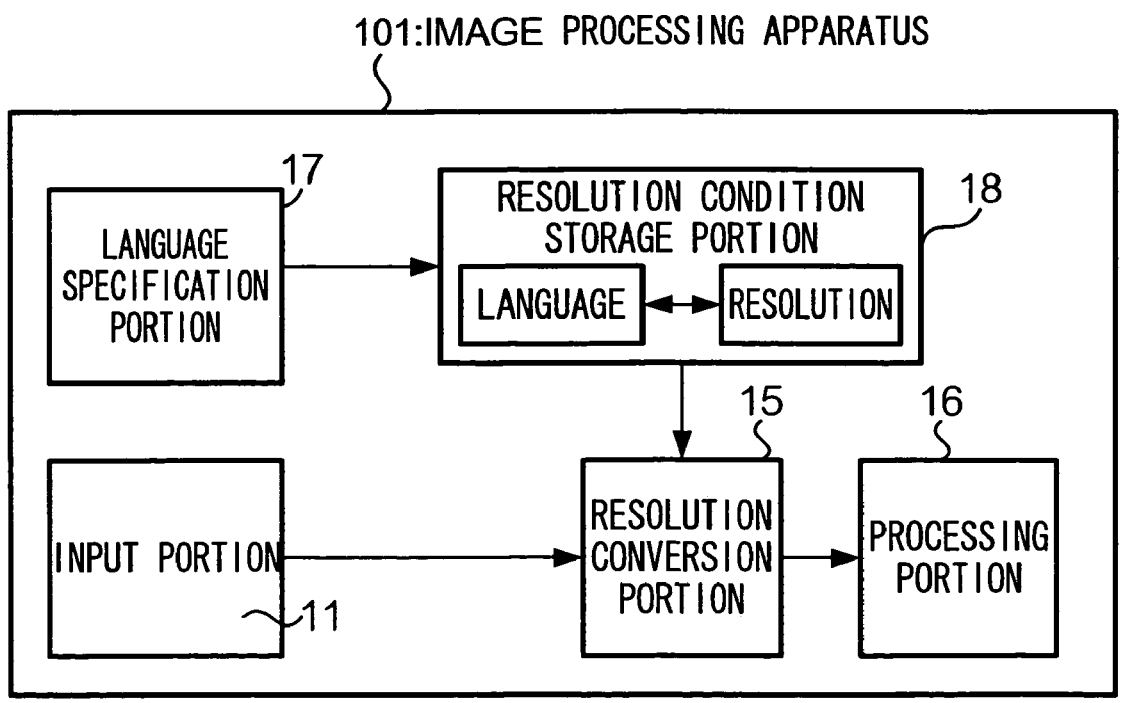
FIG. 5 is a block diagram that shows the configuration of an image processing apparatus according to a second embodiment.

FIG. 5 shows the configuration of an image processing apparatus 101 according to the second embodiment. In the configuration shown in FIG. 5, parts of the configuration that are the same as in the image processing apparatus 100 shown in FIG. 3 are given the same reference numerals. This image processing apparatus 101 differs from the image processing apparatus 100 described above in that a language specification portion 17 and a resolution condition storage portion 18 are provided instead of the image reduction portion 12, the reduction factor specification portion 13, and the resolution specification portion 14 in FIG. 3. The language specification portion 17 specifies language types that are depicted in the document expressed by the document data that has been input into the input portion 11. Specifically, the image processing apparatus 101 displays an operating screen as shown in FIG. 6 on a touch-panel user interface apparatus, and specifies the language types that have been designated on this operating screen as the language types that are depicted in the document expressed by the document data that has been input.

Next the language types and resolutions are stored associated with one another in the resolution condition storage portion. For example, FIG. 7 shows a case in which the resolution for English is 200 dpi, the resolution for Japanese is 400 dpi, and the resolution for Chinese is 400 dpi. In this case, based on the principles as stated in the first embodiment, it is desirable, for example, that documents of each language that is frequently used in an office in which the image processing apparatus is installed are read by the input portion, and resolutions corresponding to the reduction factors at which the blank regions of each character do not disappear are stored in this resolution condition storage portion.

When a resolution appropriate for the input document data is specified in this manner, the resolution conversion portion 15 converts the resolution of the document data in the same way as in the first embodiment. The processing portion performs various processing on this document data whose resolution has been converted.

According to the second embodiment described above, the image processing apparatus converts the resolution of the document data with a suitable resolution according to the language type, and computer processing can be performed on this document data. Thus, when designating processing such as character recognition, a resolution that is optimal for the language type of the document is automatically selected, and it is possible to obtain the result of a higher recognition rate. Also, that processing can be performed by handling only a small amount of data.

(3) Modified Examples

The above embodiments may also be modified in the following manner.

In the second embodiment, when the image processing apparatus performs machine translation, along with selecting an optimal resolution according to the languages depicted in the document manuscript that has been input, it is possible to output the results of character recognition and translation after translation has been performed using resolutions that are ideal for those languages. Thus, because it is possible to select resolutions at the time of input and the time of output that are suitable for the respective languages, it is possible to obtain output results that have high precision and are easy to read.

A computer program for the image processing apparatuses 100 and 101 to perform the operations described above can be provided in the image processing apparatuses 100 and 101 by being stored on a storage medium such as a magnetic storage medium, optical storage medium, or ROM that is readable by a computing apparatus such as a CPU. Also, such a computer program can also be downloaded to the image processing apparatuses 100 and 101 through a network such as the Internet.

(4) Remarks

As described above, one aspect of the present invention provides an image processing apparatus that includes an input unit that inputs document data; an image reduction unit that sequentially reduces a document expressed by document data that has been input step-by-step, while changing a reduction factor; a reduction factor specification unit that refers to the characters that constitute the document that has been reduced with the respective reduction factors, and specifies a reduction factor at which blank regions surrounded by line portions that express each character do not disappear; a resolution specification unit that specifies a resolution of the characters for the reduction factor that has been specified; a resolution conversion unit that converts the resolution of the document data that has been input by the input unit to the resolution that has been specified by the resolution specification unit; and a processing unit that performs predetermined processing for the document data whose resolution has been converted.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-90231 filed on Mar. 25, 2005 including specification, claims, drawings and abstract is incorporated herein by reference in its entirety.

What is claimed is:

1. An image processing apparatus, comprising:
   an input unit that inputs document data;
   an image reduction unit that sequentially reduces a document expressed by document data that has been input, while changing a reduction factor in stages;
   a reduction factor specification unit that refers to the characters that constitute the document that has been reduced with the respective reduction factors, and specifies the largest reduction factor at which blank regions surrounded by line portions that express each character do not disappear;

a resolution specification unit that specifies a resolution of the characters for the reduction factor that has been specified; and a resolution conversion unit that converts a resolution of the document data that has been input by the input unit to the resolution that has been specified by the resolution specification unit, wherein the reduction factor specification unit:

captures character regions from the document before being reduced by the image reduction unit;

of the regions that are surrounded by line portions in each character region that has been captured, specifies regions larger than a predetermined size as the blank regions;

counts a number of the blank regions in the document before being reduced and in the document that has been reduced with the respective reduction factors;

specifies the smallest reduction factor at which the number of blank regions in the reduced document is less than the number of the blank regions that has been counted before reduction of the document; and specifies, as the largest reduction factor at which the blank regions surrounded by the line portions that express each character do not disappear, a reduction factor that is one step less than the smallest reduction factor at which the number of the blank regions in the reduced document is less than the number of the blank regions that has been counted before reduction of the document.

2. The image processing apparatus according to claim 1, further comprising a processing unit that performs at least any one of character recognition processing for the document data whose resolution has been converted, processing in which translation is further performed after performing character recognition processing for the document data whose resolution has been converted, processing that stores the document data whose resolution has been converted in a storage unit, or processing that outputs the document data whose resolution has been converted to an external apparatus.

3. The image processing apparatus according to claim 1, wherein the reduction factor specification unit extracts the regions that are surrounded by line portions in each character region as a set of points in each character region that cannot reach a border line of the character region due to being blocked by the line portions.

4. The image processing apparatus according to claim 1, wherein points in each character region of the document expressed by the input document data other than those constituting the line portions are provided with a color different from a color of the line portions, and the reduction factor specification unit converts the color of a set of points other than those constituting the line portions in each character region that can reach a border line of the character region without being blocked by the line portions to the color of the line portions, and thereafter extracts the regions that are surrounded by the line portions in each character region as a set of points in each character region that remain to have the color different from the color of the line portions.

5. An image processing method, comprising:

sequentially reducing a document expressed by document data that has been input while changing a reduction factor in stages;

referring to characters that constitute the document that has been reduced with the respective reduction factors, and specifying the largest reduction factor at which blank regions surrounded by line portions that express each character do not disappear;

specifying a resolution of the characters for the reduction factor that has been specified; and converting a resolution of the document data that has been input to the resolution that has been specified, wherein specifying the largest reduction factor at which the blank regions surrounded by the line portions that express each character do not disappear comprises:

capturing character regions from the document before being reduced;

of the regions that are surrounded by line portions in each character region that has been captured, specifying regions larger than a predetermined size as the blank regions;

counting a number of the blank regions in the document before being reduced and in the document that has been reduced with the respective reduction factors;

specifying the smallest reduction factor at which the number of blank regions in the reduced document is less than the number of the blank regions that has been counted before reduction of the document; and specifying, as the largest reduction factor at which the blank regions surrounded by the line portions that express each character do not disappear, a reduction factor that is one step less than the smallest reduction factor at which the number of the blank regions in the reduced document is less than the number of the blank regions that has been counted before reduction of the document.

* * * * *